US009770071B2

(12) United States Patent
Kingery

(10) Patent No.: US 9,770,071 B2
(45) Date of Patent: Sep. 26, 2017

(54) PARACHUTE CORD TIE DOWN

(71) Applicant: Kenneth G. Kingery, Mesa, AZ (US)

(72) Inventor: Kenneth G. Kingery, Mesa, AZ (US)

( * ) Notice: Subject to any disclaimer, the term of this patent is extended or adjusted under 35 U.S.C. 154(b) by 108 days.

(21) Appl. No.: 13/953,283

(22) Filed: Jul. 29, 2013

(65) Prior Publication Data

US 2014/0034888 A1 Feb. 6, 2014

Related U.S. Application Data

(60) Provisional application No. 61/680,056, filed on Aug. 6, 2012.

(51) Int. Cl.
| *B66D 3/04* | (2006.01) |
| *A44B 11/00* | (2006.01) |
| *B60P 7/08* | (2006.01) |

(52) U.S. Cl.
CPC .............. *A44B 11/00* (2013.01); *B60P 7/083* (2013.01); *B66D 3/04* (2013.01); *Y10T 24/21* (2015.01)

(58) Field of Classification Search
USPC ................................................. 254/371, 391
See application file for complete search history.

(56) References Cited

U.S. PATENT DOCUMENTS

| 826,727 | A | * | 7/1906 | Koorie .................... B66D 3/10 |
| | | | | 188/64 |
| 1,107,934 | A | * | 8/1914 | Hagan ................... A62B 35/04 |
| | | | | 114/199 |
| 3,112,816 | A | * | 12/1963 | Halford .................... B66D 3/10 |
| | | | | 188/65.2 |
| 3,756,565 | A | * | 9/1973 | Sakai ....................... B66D 3/10 |
| | | | | 188/65.1 |
| 3,777,856 | A | * | 12/1973 | Gardner ................. B65H 59/10 |
| | | | | 182/5 |
| 4,097,023 | A | * | 6/1978 | Muller .................... B63B 21/08 |
| | | | | 188/65.1 |
| 4,374,473 | A | * | 2/1983 | Brockman ....................... 73/158 |
| D362,614 | S | | 9/1995 | Kingery |
| 5,615,865 | A | * | 4/1997 | Fountain .................. B66D 3/10 |
| | | | | 254/269 |
| 5,845,894 | A | * | 12/1998 | Petzl ........................ A62B 1/14 |
| | | | | 254/391 |
| 6,068,242 | A | | 5/2000 | Kingery |
| 6,092,791 | A | | 7/2000 | Kingery |
| 7,445,195 | B1 | * | 11/2008 | Huang ................. B66D 1/7415 |
| | | | | 254/223 |

(Continued)

FOREIGN PATENT DOCUMENTS

WO WO 2010/014757 * 2/2010

*Primary Examiner* — Emmanuel M Marcelo
(74) *Attorney, Agent, or Firm* — Von Hellens & Bycer Law; Matthew L. Bycer

(57) ABSTRACT

A first sidewall includes a pair of threaded bosses nesting within corresponding cavities in a second sidewall. Bolts extend through the cavities into threaded engagement with the bosses to secure the sidewalls with one another. One of the bosses supports a knurled or toothed wheel for engagement with a parachute cord. A pivotable pawl having a knurled or toothed surface is pivotably supported on a shaft anchored in the sidewalls and spring biased toward the wheel into engagement with the parachute cord to prevent translation of the parachute cord in one direction. The other boss supports a hook or cord for anchoring the tie down to an anchor.

20 Claims, 3 Drawing Sheets

(56) References Cited

U.S. PATENT DOCUMENTS

| | | | |
|---|---|---|---|
| 7,562,862 B1 * | 7/2009 | Jackson | 254/376 |
| 7,658,264 B2 * | 2/2010 | Mauthner | A62B 1/14 |
| | | | 182/5 |
| 2003/0071253 A1 * | 4/2003 | Lob | B66D 3/06 |
| | | | 254/391 |
| 2004/0201005 A1 * | 10/2004 | Stone | B66D 3/10 |
| | | | 254/391 |
| 2005/0179022 A1 * | 8/2005 | Stone | B66D 3/10 |
| | | | 254/391 |
| 2012/0012800 A1 * | 1/2012 | Chaumontet | A62B 1/10 |
| | | | 254/391 |

* cited by examiner ated by the present inventor.

PARACHUTE CORD TIE DOWN

CROSS REFERENCE TO RELATED APPLICATIONS

The present application claims priority to a provisional patent application entitled "550 CORD P-NUT AND CAMMING UNITS", assigned Ser. No. 61/680,056 and filed Aug. 6, 2012, which describes an invention made by the present inventor.

BACKGROUND OF THE INVENTION

1. Field of the Invention

The present invention relates to ratchets and, more particularly, to ratchets having a pawl for securing a cord against a spool.

2. Description of Related Prior Art

Ratchets of various types have been in existence for decades. The most common types of ratchets include a spool about which a strap or webbing is wrapped. A pivotable lever in engagement with sprockets attached to the spool can cause rotation of the spool in a first direction to wrap the webbing about the spool. A pawl or sliding member engages the sprocket to prevent rotation in the second direction whereby unwrapping of the webbing is precluded except upon release of the pawl or sliding member from the sprocket.

A second type of ratchet is used in conjunction with a rope. It includes a spool formed by a pair of facing discs having protrusions on the facing surfaces of the discs to frictionally engage the rope. The rope is wrapped about one-half of the spool. By pulling on the free end of the rope, the spool is caused to turn in one direction to provide tension to the other end of the rope. Slippage of the other end of the rope in the other direction is precluded by the frictional engagement between the rope and the protrusions of the faces of the disc. A spring-loaded pawl precludes rotation of the spool in the other direction. By pivoting the pawl out of engagement with the spool, the rope is free to cause rotation of the spool in either direction. U.S. Pat. Nos. 6,068,242, 6,092,791, and Des.362,614 are representative of ratchets of this type and are incorporated herein by reference.

The major distinction between these two types of spools may be categorized as follows. In the first type, slippage of the webbing from about a rotatably locked spool is prevented by the friction attendant layers of wrapped webbing; in some embodiments, the free end of the webbing extends through a diametrically oriented slot in the spool.

In the second type of ratchet, the friction between the rope and the protrusions on opposing faces of the discs forming the spool create sufficient friction and compression of the rope therebetween to preclude slippage.

SUMMARY OF THE INVENTION

The present invention is directed to a ratchet for use with small diameter cords on the order of one-eighth to one-quarter inch, such as commonly available parachute cord. A spool, in the nature of a cylinder, includes either a knurled surface or a toothed surface for frictionally engaging the cord. A pawl includes a corresponding knurled or toothed surface and is spring-biased against the spool to frictionally and mechanically engage the cord therebetween. Exerting a pulling force on the cord to be tensioned and exiting from the ratchet will cause the pawl to be pivoted toward the spool and firmly engage the cord between the spool and the pawl. Such engagement will preclude translation of the cord due to its frictional engagement with the pawl. Upon pulling the free end of the cord, the pawl will be pivotally urged away from the spool and the frictional engagement of the cord with the spool and the pawl will be released and permit the spool to rotate in accordance with the force exerted on the free end of the cord. A hook or other mechanism may be attached to the ratchet to anchor the ratchet or to engage a member to be moved.

It is therefore a primary object of the present invention to provide a ratchet for use with a small diameter cord.

Another object of the present invention is to provide a low parts count ratchet.

Still another object of the present invention is to provide a ratchet having essentially only two moving parts.

Yet another object of the present invention is to provide a ratchet having a pawl for locking a cord against a freely rotatable spool.

A further object of the present invention is to provide a ratchet with knurled surfaces on a spool and on a pawl.

A still further object of the present invention is to provide a ratchet having a toothed surface on a spool and a toothed surface on a pawl.

A yet further object of the present invention is to provide a method for applying tension to a small diameter cord.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DESCRIPTION OF THE PREFERRED EMBODIMENT

Figure 1:
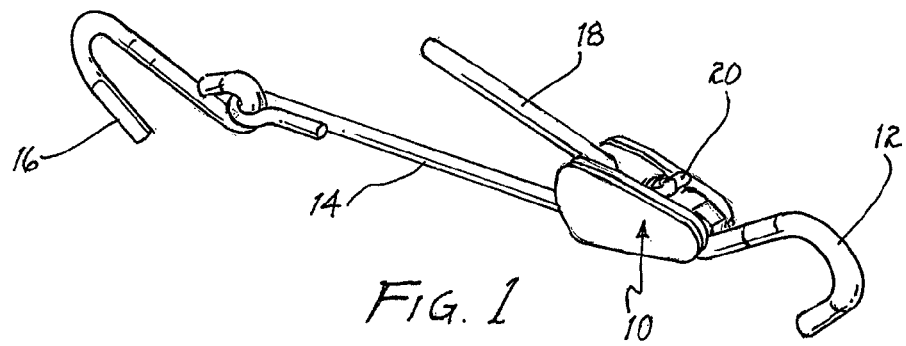
FIG. 1 is an isometric view of the present invention having an open hook attached to one end and a cord terminated by an open hook extending from the other end.
Figure 2:
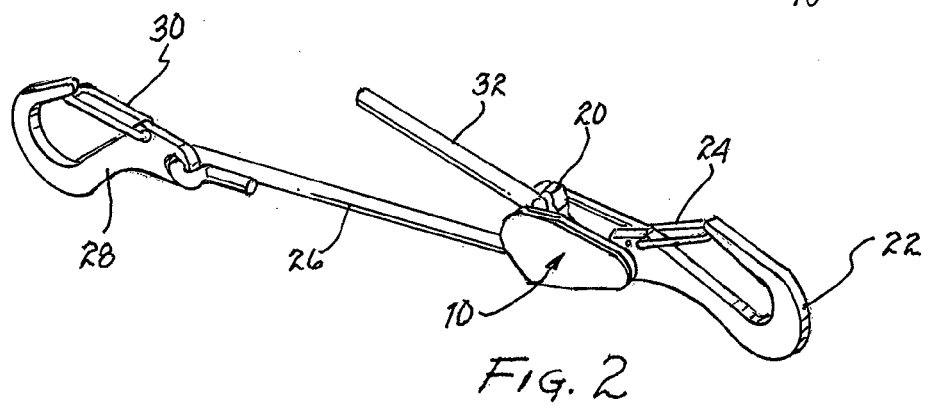
FIG. 2 is an isometric view of the present invention having a hook with a guard extending from one end and a hook with a guard terminating a cord extending from the other end.

Referring to FIG. 1, there is shown a ratchet 10 having an open ended hook 12 extending from one end and a cord 14 to be tensioned and terminated by a hook 16 extends from the other end. A free end 18 of the cord also extends from the other end of the ratchet. A spring-loaded pawl 20 is pivotally supported within ratchet 10 and is shown in the position wherein it is essentially disengaged from the cord extending partially about a spool (not shown). FIG. 2 is similar to FIG. 1 and the differences will be described. A hook 22 having a guard 24 extends from one end of ratchet 10. A further cord 26 to be tensioned and terminated by a hook 28 having a guard 30 extends from the other end of the ratchet. Free end 32 of the cord also extends from the other end of the ratchet. Herein, pawl 20 is shown in the position wherein it is biased against the cord and spool interior of the ratchet.

Figure 5:
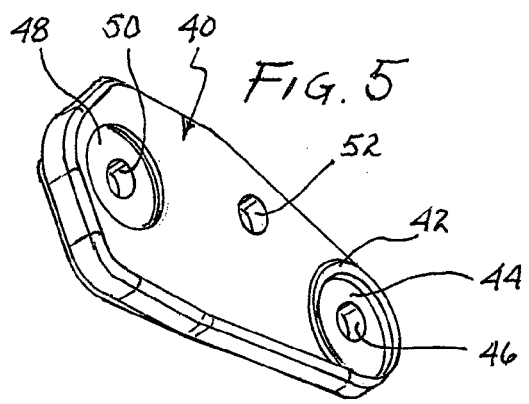
FIG. 5 is an isometric view of the inside surface of the sidewall shown in FIG. 3.
Figure 3:
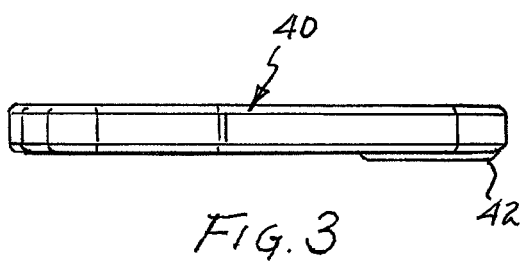
FIG. 3 is a side view of one sidewall of the ratchet.

As shown in FIGS. 3 and 5, sidewall 40 includes a shoulder 42 encircling a depression 44 having a passageway 46 extending through the sidewall. Sidewall 40 includes a further depression 48 and a passageway 50 extending therethrough. A circular cavity 52 is formed in the sidewall.

Figure 6:
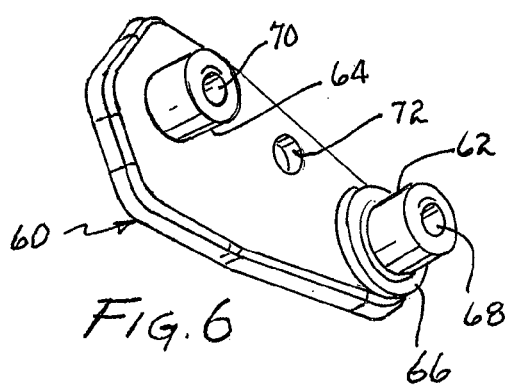
FIG. 6 is an isometric view of the inside surface of the sidewall shown in FIG. 4.
Figure 4:
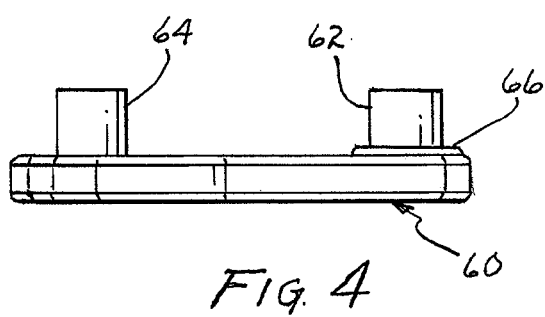
FIG. 4 is a side view of another sidewall of the ratchet.

Referring jointly to FIGS. 4 and 6, there is shown a mating sidewall 60 which includes a pair of bosses 62, 64 extending therefrom. A shoulder 66 extends about the base of boss 62. Boss 62 includes a cavity 68 and boss 64 includes a cavity 70. A further cavity 72 is formed in sidewall 60.

Figure 7:
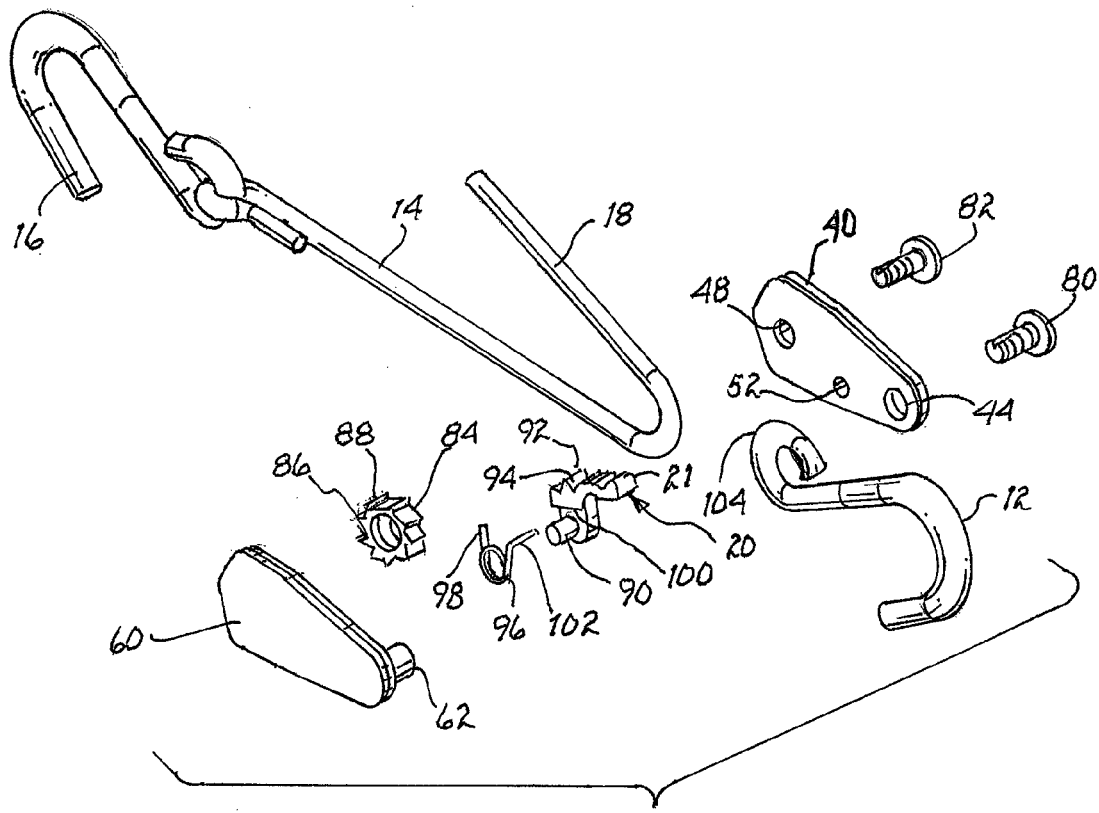
FIG. 7 is an exploded view of the ratchet shown in FIG. 1.

FIG. 7 is an exploded view of the assembly shown in FIG. 1. Common reference numerals will be recited. Sidewall 60 includes a pair of bosses (see FIGS. 4 and 6), of which boss 62 is shown. Sidewall 40 includes depressions 44, 48 and cavity 52 (as shown in FIGS. 3 and 5). A pair of bolts 80, 82 extend through passageways 46, 50 in sidewall 40 into threaded engagement with cavities 68, 70 in bosses 62, 64. Upon such threaded engagement, the bosses nest within depressions 44, 48 to establish a rigid connection between the sidewalls.

A spool 84 is rotatably supported upon boss 64 (see FIG. 6). The spool includes a plurality of teeth 86. Each of these teeth includes a surface 88 that is radially aligned. Pawl 20 is rotatably supported upon shaft 90, which shaft is nested within cavities 52, 72 (see FIGS. 5 and 6). Pawl 20 includes a plurality of teeth 92, each of which teeth includes a surface 94 radially oriented with respect to the axis of rotation of shaft 90. A spring 96 includes an arm 98 bearing against a slot 100 formed in pawl 20. Alternatively, arm 98 may be lodged upon a ledge in the pawl to urge counterclockwise rotation of the pawl (as illustrated). That is, spring 96 will bias pawl 20 against spool 84. The other arm 102 of spring 96 bears against end 104 of hook 12. As the terminal surface of end 104 is essentially of constant diameter, the position of arm 102 will remain essentially fixed irrespective of rotational movement of the hook. End 104 of hook 12 is bent back upon itself to define a space therewithin. Boss 62 extends into this space and thereby supports the hook while accommodating pivotal movement of the hook about the axis of boss 62.

Figure 8:
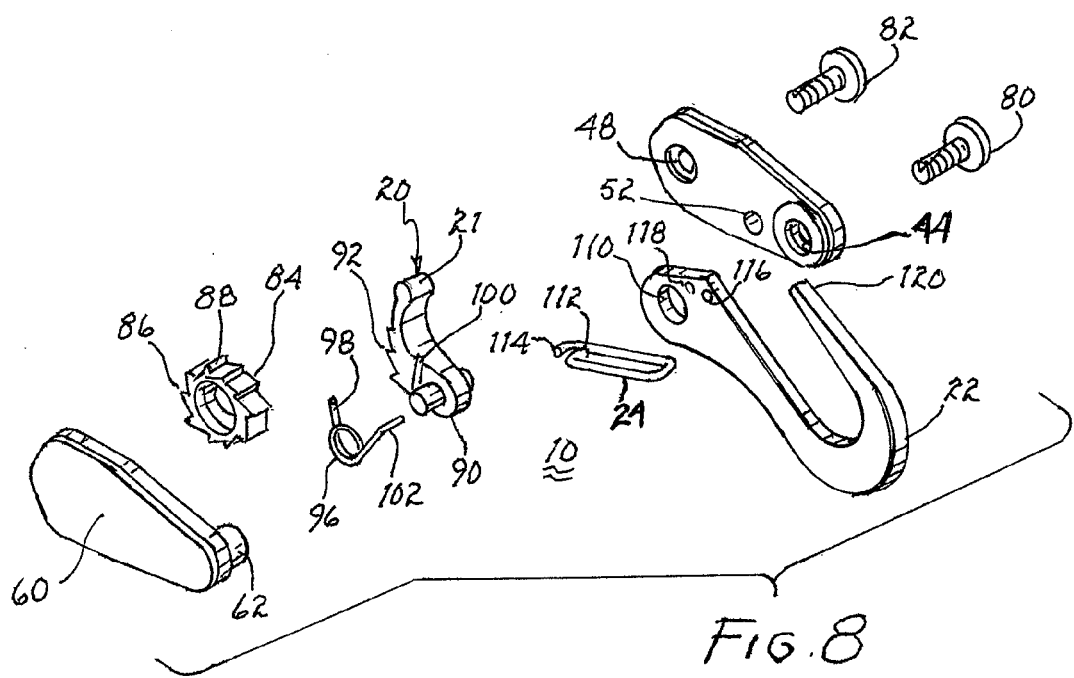
FIG. 8 is an exploded view of the ratchet shown in FIG. 2 and embodying a toothed wheel and a toothed pawl.

FIG. 8 illustrates ratchet 10 in the configuration shown in FIG. 2. All but the hook shown in FIG. 8 is duplicative of the corresponding components shown and described in FIG. 7. Accordingly, common reference numerals will be used for common elements. Pawl 20 is angularly displaced from the angular orientation of pawl 20 shown in FIG. 7 and toward spool 84, as is evident from the position of thumbknob 21. Thereby, cord 14 extending partially about the spool will be engaged by teeth 92 of the pawl to prevent translation of cord 14 toward hook 16. It is understood that translation of cord 14 in the other direction can be accomplished by pulling on free end 18 as such movement will result in angular movement of the pawl in the other direction. Hook 22 includes a passageway 110 for engaging boss 62 and permit pivotal movement of the hook thereabout. Guard 24 includes free ends 112 and 114. These free ends engage passageways 116, 118, respectively, and anchor the free ends therein. Any pivotal movement of guard 24 will be resisted by the springness of the wire forming the guard. Thus, the guard tends to remain in engagement with the underside of end 120 of hook 22, as shown in FIG. 2.

Figure 9:
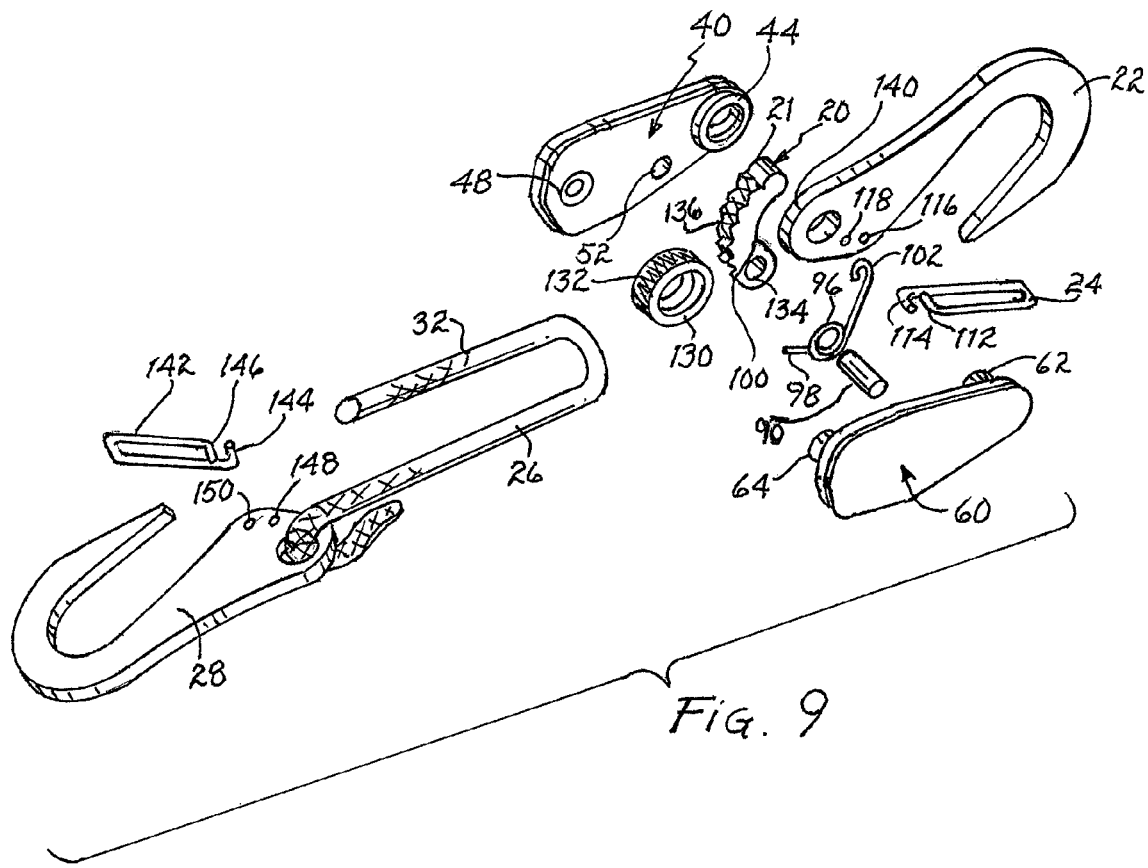
FIG. 9 is an exploded view of the ratchet shown in FIG. 2 and illustrating a knurled spool and a knurled pawl.
Figure 10:
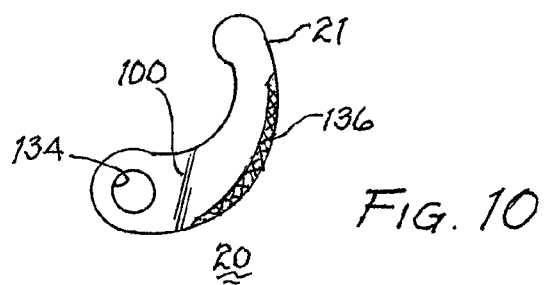
FIG. 10 is a side view of the knurled pawl shown in FIG. 9.
Figure 11:
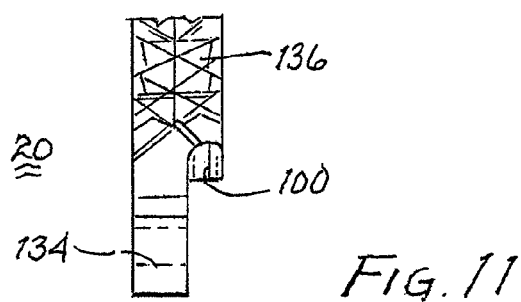
FIG. 11 is an end view of the knurled pawl showing the slot for the spring end.

Referring jointly to FIGS. 9, 10 and 11, the ratchet shown in FIG. 2 will be described in further detail. Common numerals will be used with common elements. Spool 130 is freely rotatably mounted on boss 64. It includes a knurled cylindrical surface 132 for frictionally engaging cord 26 partially wrapped thereabout. A shaft 90 lodged within cavities 52, 72 (see FIGS. 5 and 6) supports pawl 20 via passageway 134. The surface of the pawl toward spool 130 is knurled by knurling 136. Slot 100 supports arm 98 of spring 96 (as discussed above with respect to FIG. 8). Arm 102 of the spring rides along curved surface 140 of hook 22. Thereby, pawl 20 is biased by spring 96 against spool 130.

When tension is applied to cord 26 in the direction of hook 28, pawl 20, being already biased towards spool 130 by spring 96, will be urged into further counterclockwise movement to compress the cord with knurling 132 on the spool and knurling 136 on the pawl. Thereby, the cord will become firmly lodged between the spool and the pawl. Upon exertion of a translatory force on free end 32, the resulting movement of the cord about the spool will tend to urge clockwise movement of the pawl and thereby reduce the pressure of knurling 132 and 136 upon the cord and permit rotation of spool 130 and translation of the cord. As illustrated, hook 28 may include a guard 142 having ends 144, 146 in engagement with passageways 148, 150, respectively.

Shoulders 42, 66 shown in FIGS. 3, 4, 5 and 6, serve the primary function of locating the attached hook at a central location along the boss. It is to be understood that further shoulders may be formed in the sidewalls attendant boss 64 and about depression 48 to ensure a relatively central location of the spool along boss 64.

I claim:

1. A tie down for use with a parachute cord, said tie down comprising:
   (a) a pair of sidewalls;
   (b) a pair of bosses extending from one sidewall of said pair of sidewalls into nested engagement with the other sidewall of said pair of sidewalls;
   (c) a pair of bolts extending through said other sidewall of said pair of sidewalls into engagement with respective ones of said bosses;
   (d) a wheel in the shape of a ring rotatably supported upon one boss of said pair of bosses along a rotation axis for engagement with the parachute cord, said wheel including a plurality of teeth extending radially from said wheel rotation axis;
   (e) a pawl rotatably supported on a shaft supported between said pair of sidewalls and proximate said wheel, said pawl including a plurality of further teeth disposed along one side and extending toward said wheel;
   (f) a spring for biasing said pawl toward said wheel to urge compression of the parachute cord between said further teeth of said pawl and said teeth of said wheel; and
   (g) a hook mounted to the other boss of said pair of bosses and adapted to engage an element.

2. The tie down as set forth in claim 1 wherein said pawl includes a thumb knob for pivoting said pawl away from said wheel.

3. The tie down as set forth in claim 1 wherein said other sidewall includes a pair of depressions for receiving said pair of bosses.

4. The tie down as set forth in claim 3 including a passageway extending through said other sidewall from each depression of said pair of depressions for receiving a respective bolt of said pair of bolts.

5. The tie down as set forth in claim 3 including a shoulder formed in said one sidewall about said other boss and a further shoulder formed in said other sidewall about the respective depression of said pair of depressions to accommodate said hook for pivotal movement of said hook about an axis of said other boss.

6. The tie down as set forth in claim 1 wherein said hook includes a spring loaded guard.

7. The tie down as set forth in claim 1 wherein said each of said plurality of said further teeth including a surface perpendicular to the body of said pawl adapted for engagement with a surface of said wheel.

8. The tie down as set forth in claim 7 wherein said wheel includes a plurality of teeth and each tooth of said toothed wheel including a radially aligned surface from center of said wheel, said radially aligned surface adapted for engagement with a surface of said pawl.

9. The tie down as set forth in claim 1 wherein said wheel includes a plurality of teeth and each tooth of said toothed wheel including a radially aligned surface from center of said wheel, said radially aligned surface adapted for engagement with a surface of said pawl.

10. A tie down for use with a parachute cord, said tie down comprising:
(a) a pair of sidewalls;
(b) a pair of bosses extending from one sidewall of said pair of sidewalls into nested engagement with the other sidewall of said pair of sidewalls;
(c) a pair of bolts extending through said other sidewall of said pair of sidewalls into threaded engagement with respective ones of said bosses;
(d) a wheel in the shape of a cylindrical ring rotatably supported upon one boss of said pair of bosses for engagement with the parachute cord, said wheel including knurling about the external cylindrical surface of said wheel;
(e) a pawl rotatably supported on a shaft extending intermediate said pair of sidewalls and proximate said wheel, said pawl including further knurling along one surface of said pawl in proximity to said wheel;
(f) a spring for biasing said pawl toward said wheel to urge compression of the parachute cord against said wheel and frictional engagement with the knurling on said wheel and the further knurling on said pawl; and
(g) a hook attached to the other boss of said pair of bosses and adapted to engage an element.

11. The tie down as set forth in claim 10 wherein said pawl includes a thumb knob for pivoting said pawl away from said wheel.

12. The tie down as set forth in claim 10 wherein said other sidewall includes a pair of depressions for receiving a respective one of said pair of bosses.

13. The tie down as set forth in claim 12 including a passageway extending through said other sidewall from each depression of said pair of depressions for receiving a respective bolt of said pair of bolts.

14. The tie down as set forth in claim 12 including a shoulder formed in said one sidewall about said boss and a further shoulder formed in said other sidewall about the respective depression of said pair of depressions to accommodate said hook for pivotal movement of said hook about an axis of said other boss.

15. The tie down as set forth in claim 10 wherein said hook includes a spring loaded guard.

16. The tie down as set forth in claim 10 including a recess disposed in each sidewall of said pair of sidewalls for supporting said shaft.

17. A tie down for use with a cord, said tie down comprising:
(a) a pair of spaced apart sidewalls interconnected by a pair of bosses;
(b) a wheel in the shape of a cylindrical ring rotatably mounted on one boss of said pair of bosses for engagement by the cord, said wheel including means extending radially for frictionally engaging the cord when the cord is placed thereagainst;
(c) a spring loaded pawl supported on a shaft extending between said pair of sidewalls biased against said wheel and including further means disposed along one side for frictionally engaging the cord when the cord is placed thereagainst to urge compression of the cord therebetween and restrict translation of the cord in one direction about said wheel; and
(d) a hook supported by the other boss of said pair of bosses.

18. The tie down as set forth in claim 17 wherein said frictionally engaging means and said further frictionally engaging means comprise teeth for engaging the cord.

19. The tie down as set forth in claim 18 wherein each tooth of said teeth on said wheel includes a radially aligned surface.

20. The tie down as set forth in claim 17 wherein said frictionally engaging means and said further frictionally engaging means comprise knurling for engaging the cord.

* * * * *